(12) United States Patent
Petrod

(10) Patent No.: US 12,241,440 B2
(45) Date of Patent: Mar. 4, 2025

(54) FILTRATION SYSTEM

(71) Applicant: Liebherr-Components Colmar SAS, Colmar (FR)

(72) Inventor: Lionel Petrod, Wettolsheim (FR)

(73) Assignee: LIEBHERR-COMPONENTS COLMAR SAS, Colmar (FR)

( * ) Notice: Subject to any disclaimer, the term of this patent is extended or adjusted under 35 U.S.C. 154(b) by 302 days.

(21) Appl. No.: 17/934,130

(22) Filed: Sep. 21, 2022

(65) Prior Publication Data
US 2023/0123929 A1 Apr. 20, 2023

(30) Foreign Application Priority Data
Sep. 28, 2021 (DE) .................... 10 2021 125 041.2

(51) Int. Cl.
*F02M 37/32* (2019.01)
*B01D 27/14* (2006.01)

(52) U.S. Cl.
CPC .......... *F02M 37/32* (2019.01); *B01D 27/142* (2013.01)

(58) Field of Classification Search
CPC .... F02M 37/32; B01D 27/142; B01D 35/303; B01D 35/12; B01D 2201/4007
See application file for complete search history.

(56) References Cited

U.S. PATENT DOCUMENTS 2,505,375 A * 4/1950 Wohlfarth .............. B01D 35/12
137/637.1
2011/0048548 A1 3/2011 Rahm
2018/0361282 A1 12/2018 Thorat et al.

FOREIGN PATENT DOCUMENTS

| CN | 111085033 A | 5/2020 |
|---|---|---|
| DE | 112510 C | 4/1899 |
| DE | 1801441 A1 | 6/1970 |
| DE | 19851193 C1 | 4/2000 |
| DE | 60005552 T2 | 4/2004 |

OTHER PUBLICATIONS

European Patent Office, Extended European Search Report Issued in Application No. 22193398.9, Jan. 26, 2023, Germany, 6 pages.

* cited by examiner

*Primary Examiner* — Jacob M Amick
*Assistant Examiner* — Charles J Brauch
(74) *Attorney, Agent, or Firm* — McCoy Russell LLP (57) ABSTRACT

A filtration system comprising a plurality of filters, in particular oil or fuel filters, a first operating element movable from a default position to a least one isolating position for isolating at one filter of a first group of filters from the filtration system and a second operating element movable from a default position to a least one isolating position for isolating at least one filter of a second group of filters from the filtration system. The filtration system comprises a mechanical blocking mechanism that is actuated by a movement of the first operating element out of its default position to block the second operating element in its default position and actuated by a movement of the second operating element out of its default position to block the first operating element in its default position.

20 Claims, 12 Drawing Sheets

Filters 7-8 isolated
FIG. 1E

FILTRATION SYSTEM

CROSS-REFERENCE TO RELATED APPLICATION

The present application claims priority to German Patent Application No. 10 2021 125 041.2 filed on Sep. 28, 2021. The entire contents of the above-listed application are hereby incorporated by reference for all purposes.

TECHNICAL FIELD

The present application relates to a filtration system comprising a plurality of filters, in particular oil or fuel filters. The filter system may for example be used in an engine, for example for filtering the oil of the cooling and/or lubrication circuit of the engine.

BACKGROUND

In such a system, in order to exchange the filter cartridge of a filter, it is necessary to isolate the filter from the filtration system, i. e. from the fluid line in which the filter is arranged.

For this purpose, it is known from filtration systems having two filters operating in parallel to provide an operating element movable from a default position where both filters operate in parallel to a first or to a second isolating position for isolating the first filter or the second filter from the filtration system, respectively.

Thereby, the filter cartridge of one filter can be exchanged while the other filter is still operative, such that the exchange can be done during the operation of the system, with the other filter doing all the filtering for the time that is required for the exchange.

If two such filter systems are used in parallel, each filter system may still be provided with an operating element to be able to exchange a filter cartridge of one filter while the other is operable.

The inventor of the present disclosure has however realized that simply duplicating existing filtration systems will lead to an increased risk of failure.

The object of the present disclosure is therefore to provide an improved filtration system.

SUMMARY

The present disclosure provides a filtration system comprising a plurality of filters, in particular oil or fuel filters, a first operating element movable from a default position to a least one isolating position for isolating at least one filter of a first group of filters from the filtration system and a second operating element movable from a default position to at least one isolating position for isolating at least one filter of a second group of filters from the filtration system. Further, the system comprises a mechanical blocking mechanism that is actuated by a movement of the first operating element out of its default position to block the second operating element in its default position and actuated by a movement of the second operating element out of its default position to block the first operating element in its default position.

Using two parallel filtration systems without the present disclosure, there is the risk that the operator is switching off two filters at the same time, with the risk to get too much flow through the remaining filters and then damage them and pollute the circuit.

Risk analysis has shown that the oil circuit could be polluted followed by a major engine failure in this case, i.e. if the operator is not respecting a correct sequence during filter cartridge replacement.

The safety when using two filtration systems would, without the present disclosure, therefore only rely on the operating manual and/or training of the operators, teaching them to respect some sequence during filter cartridge replacement that will avoid a parallel isolation of several filters.

The present disclosure therefore uses a mechanical blocking mechanism to eliminate this risk. The blocking mechanism can be designed to avoid a situation where both operating elements are moved to an isolating position, and may therefore avoid a situation where two filters are isolated at the same time.

This system can be applied for different media, such as fuel or oil, and is not restricted to engines but can be used in any filtration system as soon as a plurality of filters are used.

In an embodiment of the present disclosure, in a default state of the filtration system, both operating elements are arranged in their respective default position.

In an embodiment of the present disclosure, in the default position of an operating element, at least one filter out of the respective group of filters is connected to the filtration system.

In an embodiment, in the default position of an operating element, all the filters of the respective group of filters are connected to the filtration system.

In an embodiment of the present disclosure, each of the operating elements may only have one isolating position. Further, each group of filters may be formed by the at least one filter that is isolated in this isolating position.

In an embodiment of the present disclosure, however, each of the operating elements may have at least two isolating positions.

In an embodiment of the present disclosure, at least two filters are associated to each operating element, the operating element being configured to selectively isolate at least one first filter out of the at least two filters from the filtration system in a first isolating position and at least one second filter out of the at least two filters in a second isolating position.

In some embodiments, the operating element is configured to selectively isolate in each isolating position at least one out of the two filters associated to the operating element from the filtration system while keeping the at least one other filter out of the at least two filters operative and connected to the filtration system.

In an embodiment of the present disclosure, each filter is at least a duplex filter comprising two filter elements or filters arranged in parallel. For instance, the two filter elements or filters may be isolated from and connected to the filtration system by the operating element in parallel.

In such an embodiment, whenever the previous or the following definitions relate to at least one filter, the at least one filter may be formed by two filter elements or filters arranged in parallel. Further, whenever the previous or the following definitions relate to at least two filters, each of these at least two filters may be formed by two filter elements or filters arranged in parallel.

In an embodiment of the present disclosure, all the filters are arranged in parallel in a fluid duct of the filtration system when connected by the respective operating element to the filtration system.

In an embodiment of the present disclosure, the mechanical blocking mechanism comprises a blocking element operated by the first operating element to block the second operating element and a second blocking element operated by the second operating element to block the first operating element. For example, the two blocking elements may be separate elements and/or can be moved independently from each other.

In an embodiment of the present disclosure, the blocking elements are slidably arranged on the filtration system to be moved from a default position to a blocking position.

In an embodiment of the present disclosure, the blocking elements may be plates, bars and/or rods extending longitudinally between the two operating elements.

In an embodiment of the present disclosure, the first blocking element and the second blocking element are arranged on top of each other and may be guided by one or more guide pins extending through linear slots in the blocking elements.

In an embodiment of the present disclosure, the first blocking element is operatively connected to a drive element of the first operating element and the second blocking element in operatively connected to a driving element of the second operating element.

In an embodiment of the present disclosure, each blocking element is operatively connected to the respective drive element in one of its end sections.

In an embodiment of the present disclosure, the drive elements of the operating elements each comprise a guide interacting with a pin of the respective blocking element, wherein the guide may be configured as a slot.

In an embodiment of the present disclosure, the drive elements are cut from a plate material.

In an embodiment of the present disclosure, the drive elements are fixedly connected to an axis of the operating element.

In an embodiment of the present disclosure, the operating elements are rotatable from the default position to the isolating position or positions.

In an embodiment of the present disclosure, the operating elements are rotatable from the default position in two opposite directions into the respective isolating positions.

In an embodiment of the present disclosure, a drive element for driving a blocking element is rotated by the rotation of the operating element.

In an embodiment of the present disclosure, a guide of the drive element is located at a first radial distance with respect to a rotation axis of the drive element in a default section and extends from the default section to an arcuate section where it extends at a second radial distance to the rotation axis of the drive element.

In an embodiment of the present disclosure, a pin of the blocking element is arranged in the default section of the guide when the operating element is in the default position and moves from the default section to the arcuate section once the operating element is rotated away from the default position to an isolating position, such that the blocking element is displaced by the difference in the radius of the guide in the default section to the arcuate section.

In an embodiment of the present disclosure, the guide has arcuate sections on both sides of the default section corresponding to the two isolating positions.

In an embodiment of the present disclosure, the operating elements comprise and/or operate a valve element that is rotated in a valve body for establishing at least one fluid communication through a fluid passage of the valve element in the default position and blocking the fluid communication in the isolating position.

In an embodiment of the present disclosure, the valve element establishes a first and a second fluid communication to an entry port and an exit port of each filter associated to the operating element in the default position and blocks the first and the second fluid communication to at least one filter in an isolating position.

In an embodiment of the present disclosure, the valve element is provided in or fixedly connected to a rotation axis of the operating element. For instance, the valve element may be provided by cut-outs provided in a rotation axis of the operating element.

In an embodiment of the present disclosure, a first blocking element has a blocking section that is movable into blocking engagement with a blocking section of the first operating element and a second blocking element has a blocking section that is movable into blocking engagement with a blocking section of the second operating element.

In an embodiment of the present disclosure, the blocking sections of the blocking elements are formed by respective end sections of the blocking elements.

In an embodiment of the present disclosure, the blocking sections of the operating elements are formed by respective recesses.

In an embodiment of the present disclosure, the blocking sections block rotational movement of the respective operating element when engaged with each other.

In an embodiment of the present disclosure, the blocking sections of the operating elements are formed in a plate element fixedly connected to the rotation axis of the operating element.

In an embodiment of the present disclosure, each operating element comprises a handle, such as a lever, connected to the rotational axis of the operating element.

In an embodiment of the present disclosure, each filter or filter element comprises at least one filtration head housing and a replaceable filter cartridge.

In an embodiment of the present disclosure, the filtration system arranged in a fluid duct of an engine, such as in an oil or fuel duct of the engine.

The present disclosure further comprises a machine comprising a fluid duct and a filtration system as described herein arranged in the fluid duct.

In an embodiment of the present disclosure, the machine is an engine, such as an internal combustion engine.

In an embodiment of the present disclosure, the fluid duct is an oil or fuel duct.

In an embodiment of the present disclosure, the filtration system is arranged in a cooling and/or lubrication circuit of the machine, in particular of the engine.

The present disclosure will now be described in more detail with reference to figures and embodiments.

DETAILED DESCRIPTION

Figure 1A:
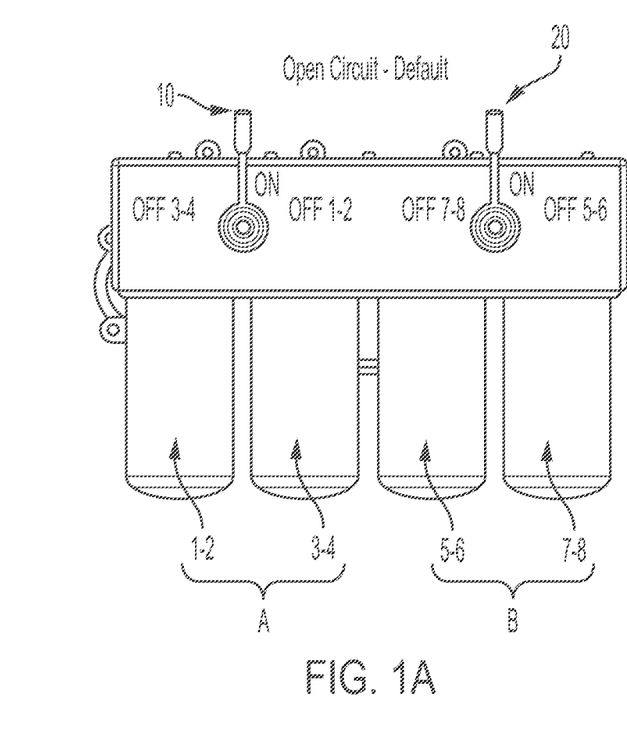
FIGS. 1A-1E: the various switching positions of the operating elements of an embodiment of the filtration system of the present disclosure.

FIGS. 1A-1E show embodiments of a filtration system of the present disclosure. The filtration system comprises two groups A and B of filters arranged in parallel in a fluid pathway of the filtration system as shown in FIG. 1A. Each group comprises at least a first filter 1-2, 5-6 and a second filter 3-4, 7-8. In the embodiment, duplex filters are used. Each duplex filter comprises two filters or filter elements arranged and operated in parallel. The drawings are to scale, although other relative dimensions may be used, if desired.

The first group A therefore comprises the first filter elements 1-2 forming a first duplex filter, and the second filters 3-4 forming a second duplex filter. The second group B comprises the first filters 5-6 forming a first duplex filter and the second filters 7-8 forming a second duplex filter. Instead of using duplex filters, the present disclosure could also use single filters or filters having more than two filters arranged and operated in parallel.

Each group of filters A, B comprises an operating element 10, 20 for selectively isolating either the first or the second filters from the filtration system. In a default position of the operating element, both the first and second filters are connected to the filtration system.

Therefore, in a first isolating position 13, 23, the respective first filters 1-2, 5-6 are isolated. In a second isolating position 12, 22, the respective second filters 3-4, 7-8 are isolated. In the default position 11, 21, all filters 1-2, 5-6, 3-4, 7-8 are connected.

Once a filter is isolated from the filtration system, the filter cartridge of the filter can be exchanged. The filtration system can be operated using the filters which are still connected.

Each of the operating elements is configured such that it only isolates, in each isolating position, either the first or the second filters from the filtration system, while the remaining second or first filters are still connected to the filtration system. This principle allows replacing a filter cartridge while the filtration system is working, because for each group of filters, at least one out of the first and the second filters will be connected to the filtration system and therefore working.

However, if the two operating elements operate independently from each other and both operating elements are in an isolating position, half of all the filters may be isolated. The remaining filtration power may therefore not be sufficient for maintaining a safe operation of the system.

The filtration system of the present disclosure therefore comprises a mechanical blocking mechanism that will avoid such a situation, because moving the one operating element out of its default position will actuate the blocking mechanism to block the other operating element in its default position.

FIGS. 1A-1E show the five possible switching positions of the operating elements 10 and 20. In situation 1A, both operating elements 10, 20 are in their default position, such that all filters are connected to the filtration system. In situation 1B, the first operating element 10 is in its first isolating position 13, isolating the first filters 1-2. In situation 1C, the first operating element 10 is in its second isolating position 12, isolating the second filters 3-4. In situation 1D, the second operating element 20 is in its first isolating position 23, isolating the first filters 5-6. In situation 1E, the second operating element 20 is in its second isolating position 22, isolating the second filters 7-8. In situations 1B and 1C, the second operating element 20 is in its default position 21, while in situations 1D and 1E, the first operating element 10 is in its default position 11. Situations where both operating elements are in an isolating position are avoided by the mechanical blocking mechanism.

Figure 2:
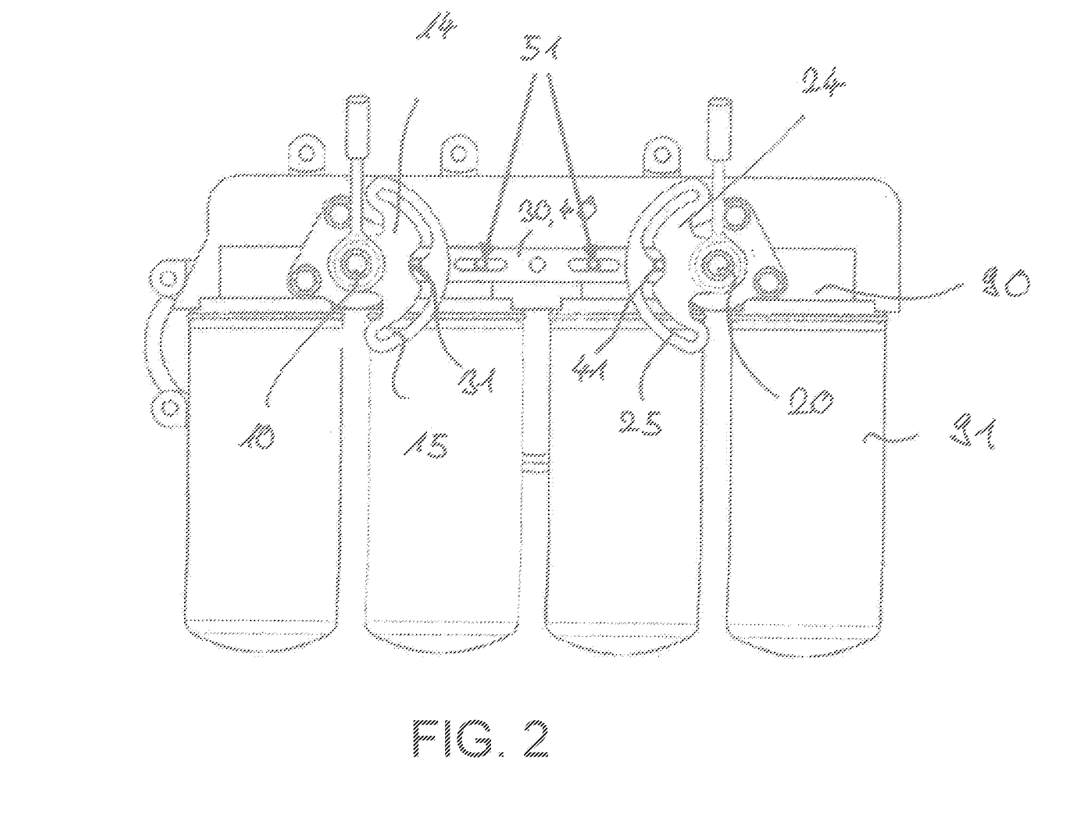
FIG. 2: an embodiment of the mechanical blocking mechanism.

FIG. 2 shows some of the main components of an embodiment of the mechanical blocking mechanism. These components of the mechanical blocking mechanism also shown in FIGS. 3A-3B separately for groups A and B.

In an embodiment, the mechanical blocking mechanism comprises a first blocking element 30 operated by the first operating element 10 to block the second operating element 20, and a second blocking element 40 operated by the second operating element 20 to block the first operating element 10.

The blocking elements 30, 40 are respectively operated by a driving element 14, 24, fixedly connected to the respective operating element 10, 20. Each driving element 14, 24 comprises a guide 15, 25 cooperating with a respective pin 31, 41 connected to the respective blocking element 30, 40.

The operating elements each have an axis of rotation 18, 28, and can be rotated from the default position 11, 21 to the two isolating positions 12, 13 and 22, 23 respectively. In the embodiment, the isolating positions are arranged on opposite sides of the default position.

Figure 3A:
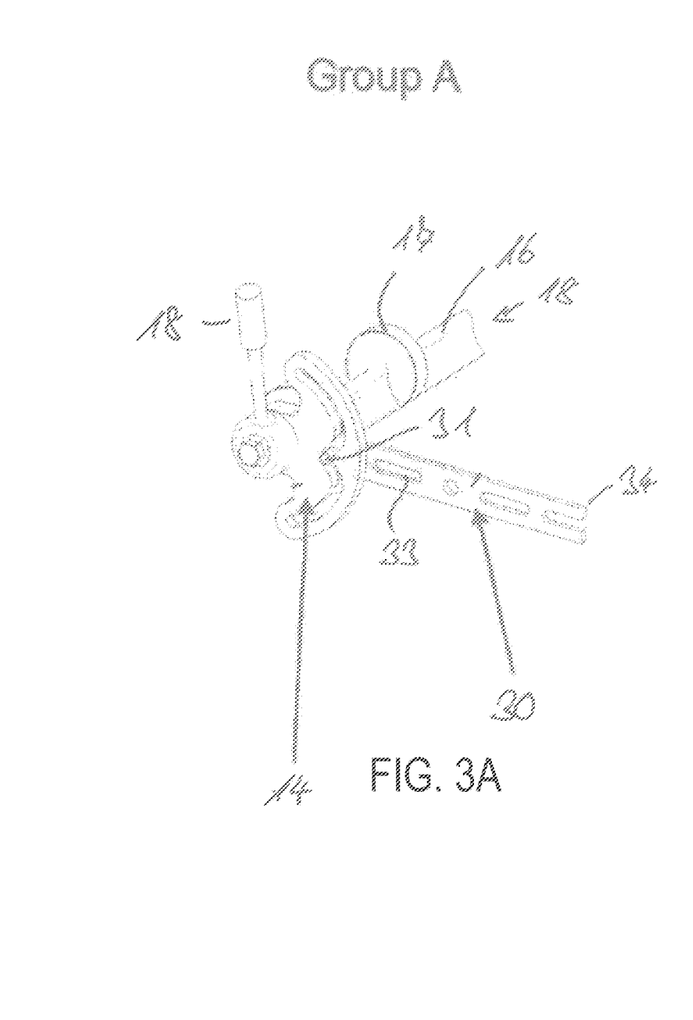
FIGS. 3A-3B: perspective views of the main elements of the blocking system.
Figure 3B:
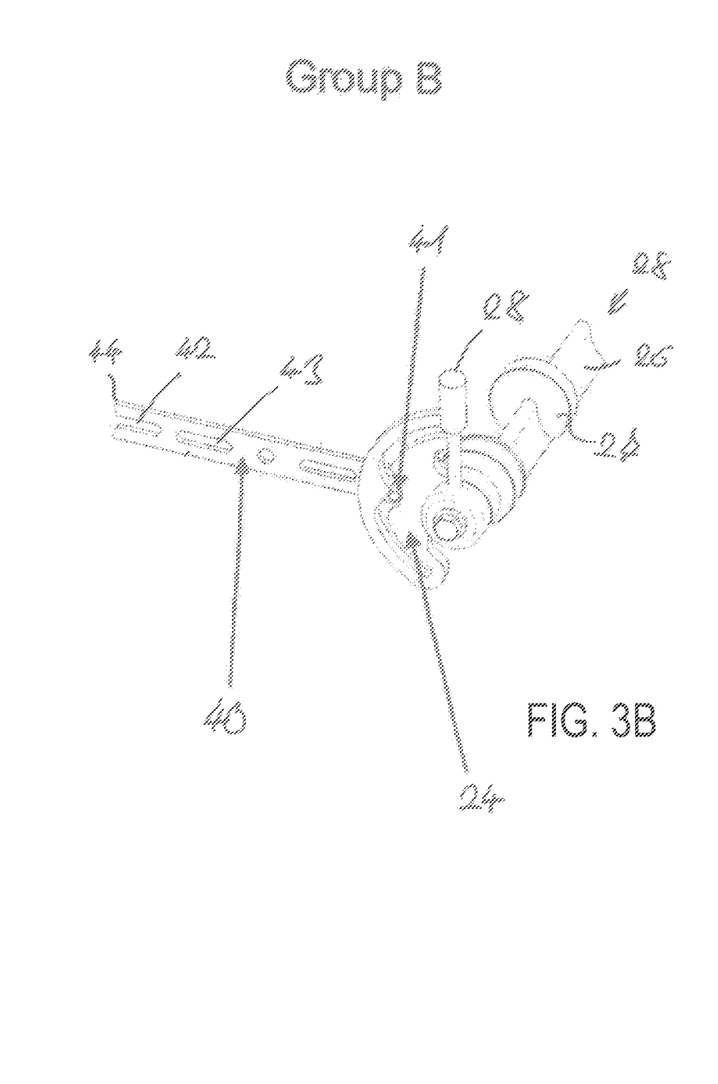

As can be seen from FIGS. 3A-3B, each operating element 10, 20 operates, by this rotation, a valve element 16, 26 to either open fluid passages or close fluid passages in a valve. In the embodiment, the valve element 16 is integrated into the axis of each operating element. Section 17, 27 separates an inlet passage of the valve from an outlet passage of the valve, which are both closed and opened by each valve element 16, 26.

Once an operating element 10, 20 is rotated, the corresponding drive element 14, 24 will equally rotate, such that the guide will be displaced in a rotational movement. Because the distance of the guide 15, 25 to the axis of the respective operating element varies along the extension of the guide, the respective pin 31, 41 slidably engaged within the respective guide 15, 25 will be displaced by such a rotation.

In an embodiment, both blocking elements 30, 40 are linearly movable from a default position to a blocking position. For instance, guide pins 51 engage with long holes 33, 43 of the blocking elements to allow a sliding movement of each blocking element along a linear path.

Therefore, the guide pins 31, 41 connected to the blocking elements 30, 40 will displace the blocking elements, depending on the position of the drive element 14, 24, along this linear direction.

The blocking elements are arranged to extend from the respective drive element that will operate the blocking element to a counter element of the other operating element to engage with the counter element in their blocking position.

In the embodiment, the blocking elements are plate elements or bars extending between the two operating elements.

In the embodiment, the two blocking elements are placed on top of each other, with the same guiding pins 51 reaching through guide holes 33, 43 in both blocking elements.

Further, the blocking elements are arranged to extend along a line connecting the two axes 18, 28 of the two operating elements, 10, 20.

At least one of the blocking elements 30, 40 has a slot 42 arranged in the end section opposite the pin 41, in order to allow the pin 31 of the other blocking element to extend through the blocking element 40 in order to engage with the respective drive element 14.

Figure 4A:
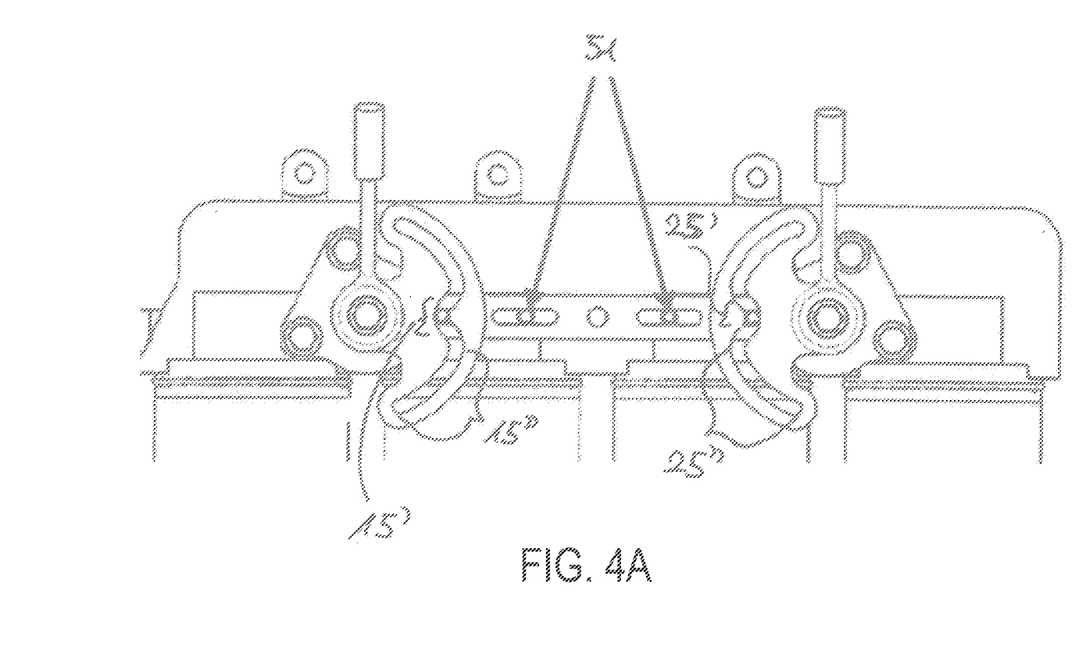
FIG. 4A: a frontal view of the blocking system with the two operating elements in their default positions.

As shown in FIG. 4A, each guide 15, 25 has a first guide section 15', 25' in which the respective pin 31, 41 is arranged if the operating element in in its default position. Further, second guide sections 15", 25" extend on both sides of the first guide section 15', 25'. Once the operating element is moved from its default position in the directions of one of its isolating positions, the pin 31, 41 will move from the first guide section 15', 25' into one of the second guide sections 15", 25".

The second guide sections 15", 25" are arcuate sections extending at a radius with respect to the axis of the respective operating element which is larger than the distance of the first guide sections 15', 25' to the respective axis. Thereby, once the respective operating element is moved from the default position in the direction of an isolating position, the respective pin 31, 41 and therefore the blocking element 30, 40 will be moved away from the axis of rotation of the operating element 30, 40 and therefore in the direction of the other operating element to engage with the counter element.

Figure 4B:
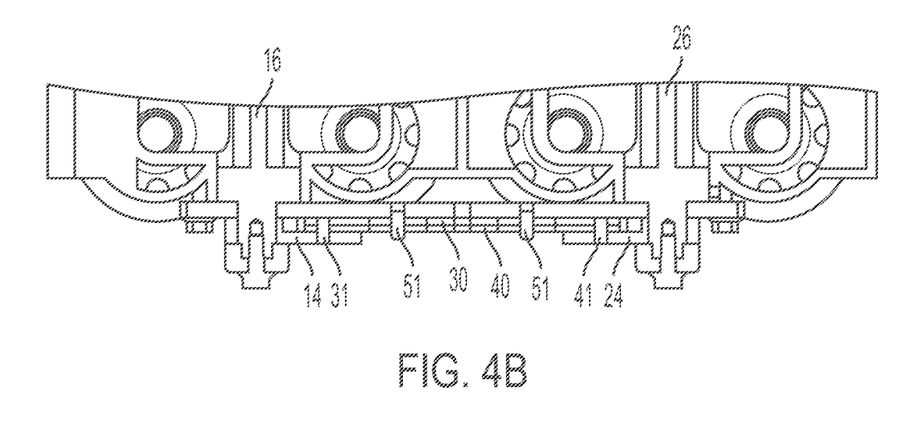
FIG. 4B: a cut view through the plane defined by the axes of the operating elements in the situation shown in FIG. 4A, FIGS. 5A-5B: detailed views of elements of the blocking mechanism, where the first operating element is free to rotate and the second operating element is blocked.

The above described configuration of the two blocking elements arranged on top of each other, with the pin 31 of the first blocking element 30 reaching trough a slit 42 in the end section of the second blocking element 40 to engage with the guide 15 of the drive element 14 of the first operating element, is shown in FIG. 4B. FIG. 4B also shows the valve elements 16 in the respective default positions opening flow channels to the respective filters.

Each operating element 10, 18 has a handle 18, 28 for rotating the operating element. In the embodiment, the handle is a lever.

Figure 5A:
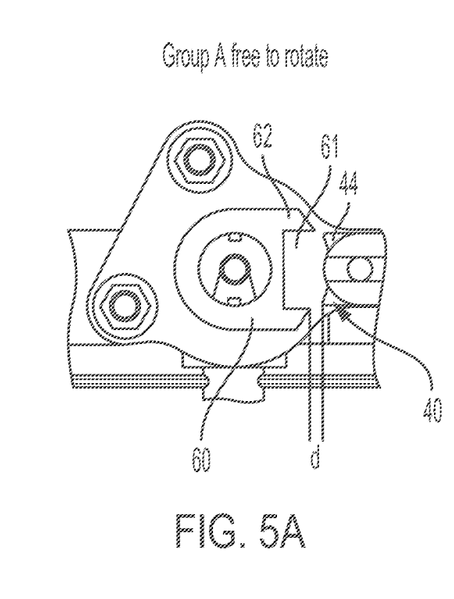
Figure 5B:
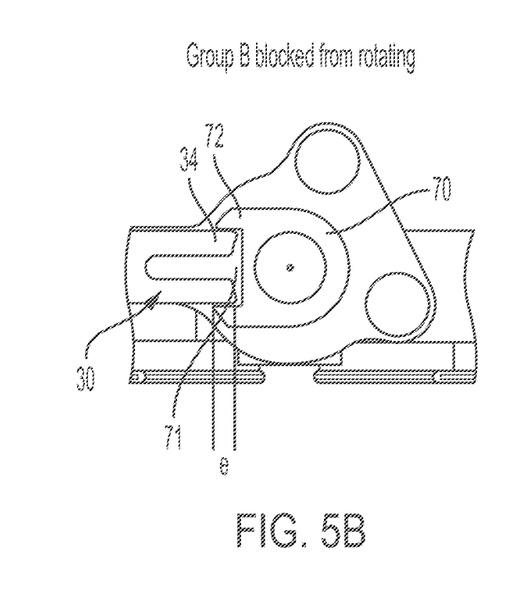

FIGS. 5A-5B show the two possible configurations between a blocking element and its respective counter element.

In one embodiment, the ends of the blocking elements 30, 40 opposite the respective pins 31, 41 have blocking edges 34, 44 that can be engaged with a recess 61, 71 of the respective counter element 60, 70. The recess 61, 71 therefore forms a blocking section engaging with the blocking element.

FIGS. 5A-5B show on the left hand side a situation where group A, i.e. the first operating element 10, is free to rotate because the second blocking element 40 comprising the blocking edges 44 is not engaged with the recess 61 of the counter element 60, with a distance d remaining between the sides 62 of the recess 61 and the blocking edges 44. On the right hand side, FIGS. 5A-5B show the situation where group B, i.e. the second operating element 20, is blocked from rotating because the first blocking element 30 engages with the corresponding counter element 70. For instance, the blocking edges 34 of the first blocking element 30 are engaged into the recess 71, with an interference e between the blocking edges 34 and the sides 72 of the recess 70 blocking a rotational movement. The sides 62, 72 of the recesses 61, 71 therefore form counter-blocking edges cooperating with the blocking edges of the blocking elements.

The respective counter elements 60, 70 are fixedly attached to the respective operating elements 10, 20 to block the rotational movement of the respective operating element 10, 20 when engaged with the blocking element.

FIGS. 6A to 8B now shows different switching positions of the filtration system and the respective positions of the blocking elements and their counter elements.

Figure 6A:
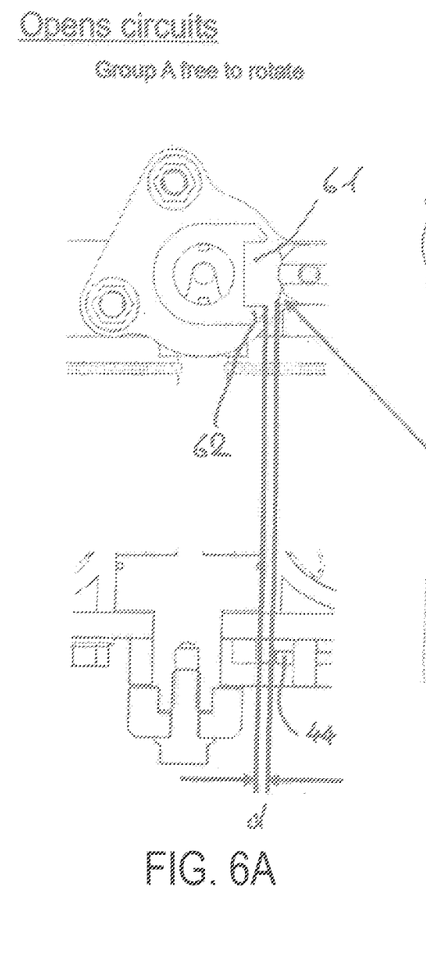
FIGS. 6A-6C: a frontal and a cut view of the mechanical blocking system together with enlarged portions in a situation where both operating elements are in the default position.
Figure 6B:
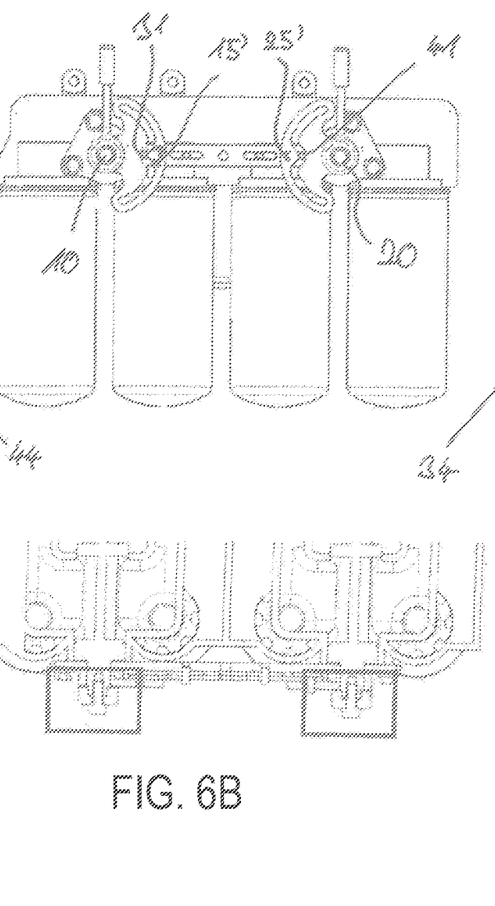
Figure 6C:
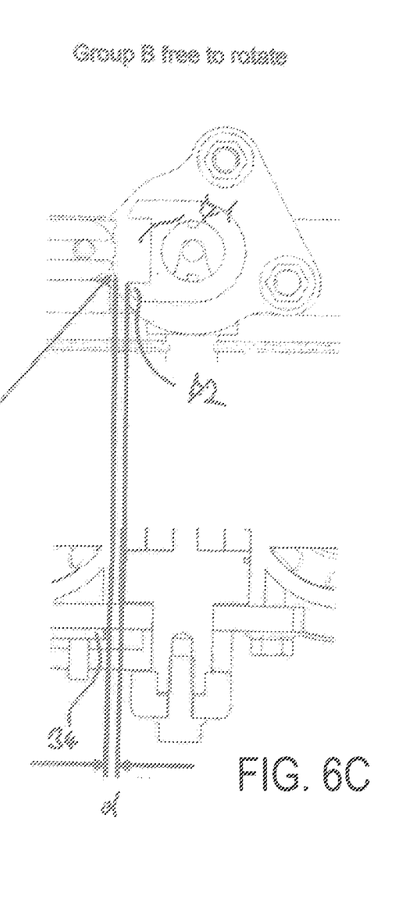

FIGS. 6A-6C show the situation of FIG. 1A, i.e. where both operating elements are in their default position. Therefore, the pins 31 and 41 are arranged in the respective default sections 15', 25' of the guides such that the blocking element are in their default positions, with the blocking edges 34, 44 arranged with a distance d to the sides 62, 72 of the recesses 61, 71, such that both operating elements are free to rotate.

Figure 1B:
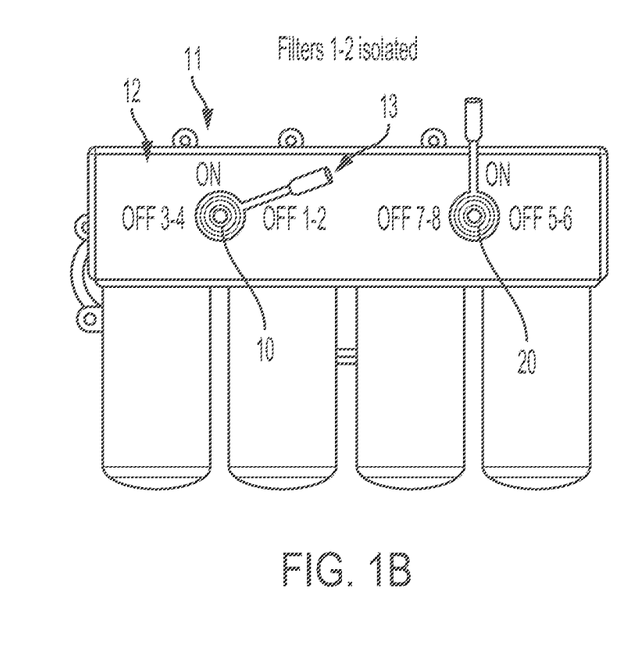
Figure 1C:
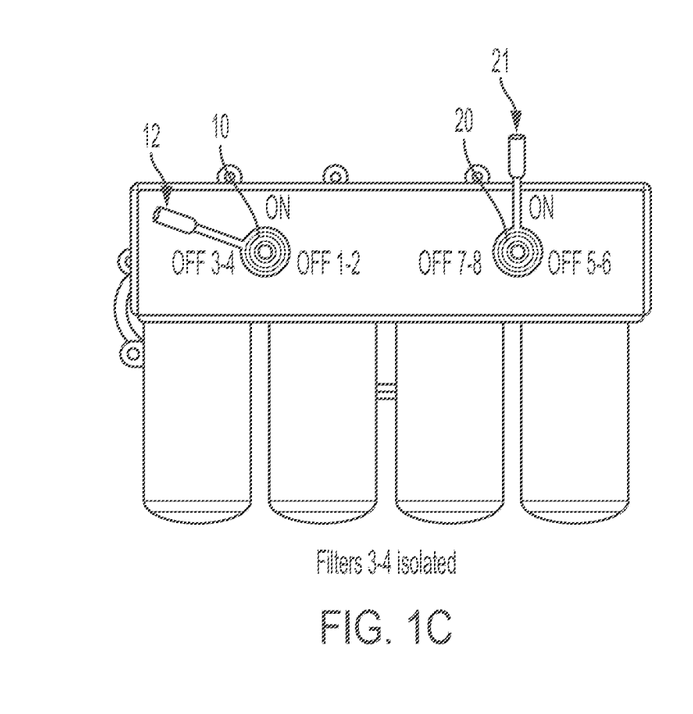
Figure 7A:
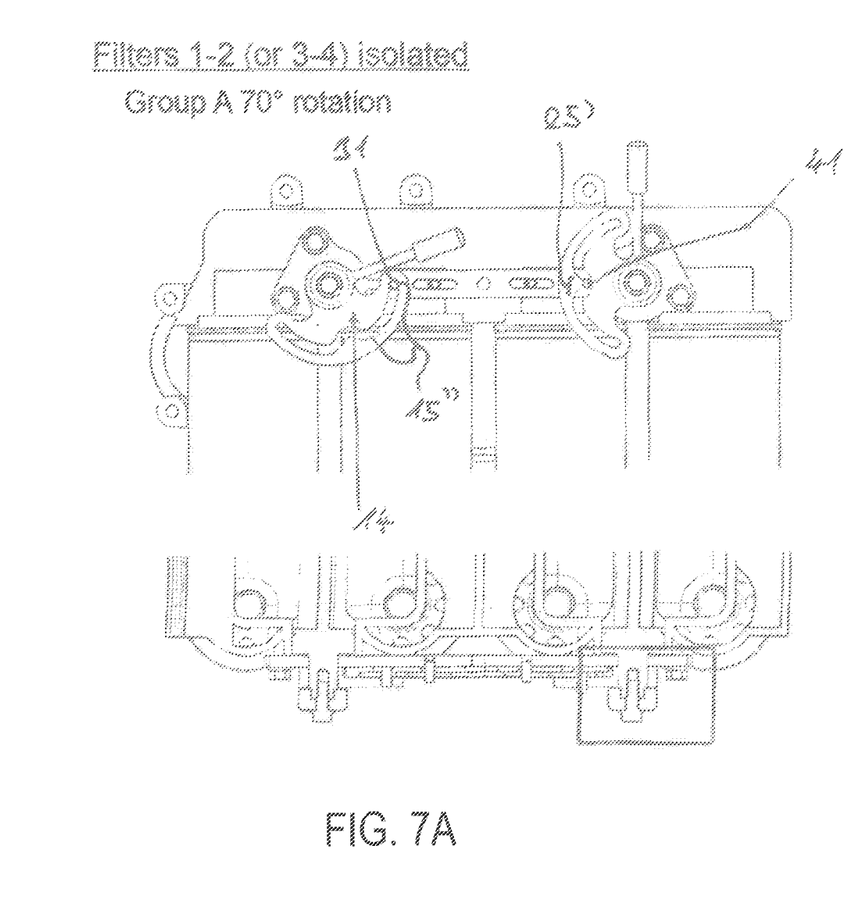
FIGS. 7A-7B: a frontal and a cut view of the mechanical blocking system together with enlarged portions for a situation where the first operating element is in an isolating position.
Figure 7B:
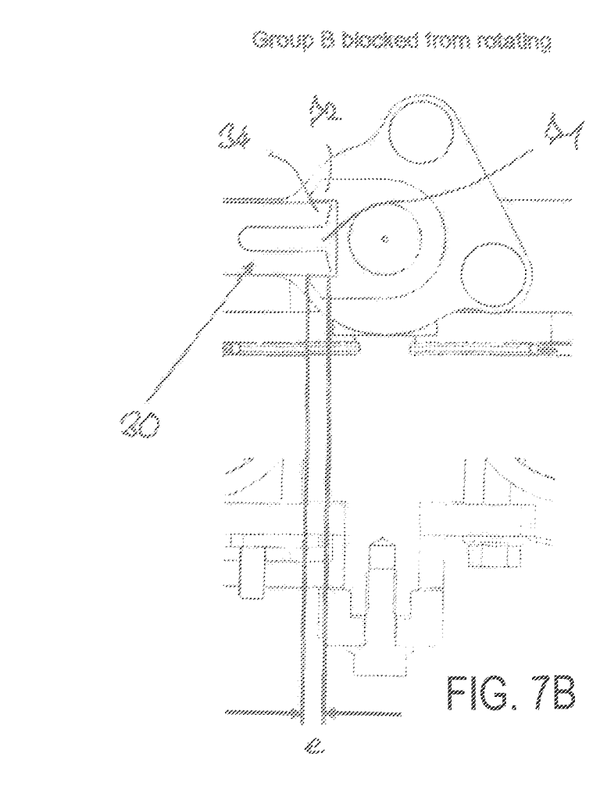

FIGS. 7A-7B show the situation of FIG. 1B, with the first operating element in its first isolation position isolating the first filters 1-2. Thereby, pin 31 of the first blocking element 30 is in the isolating section 15" of the guide 15, moving the blocking element 30 in the direction of the second operating element 20. Thereby, the blocking edges 34 engage into the recess 71, with an interference e between the blocking edges 34 of the blocking element 30 and the sides 72 of the recess 71 blocking rotation of the counter element 70. Thereby, group B and therefore the second operating element is blocked from rotating.

Figure 1D:
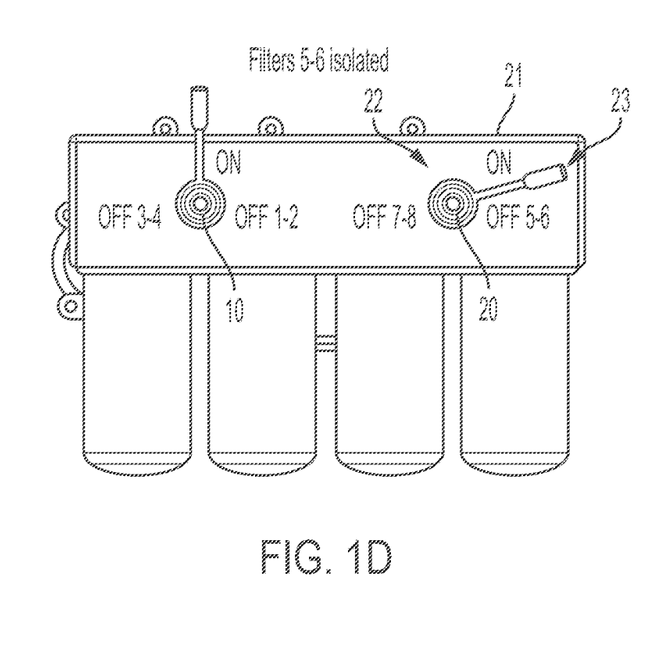
Figure 1E:
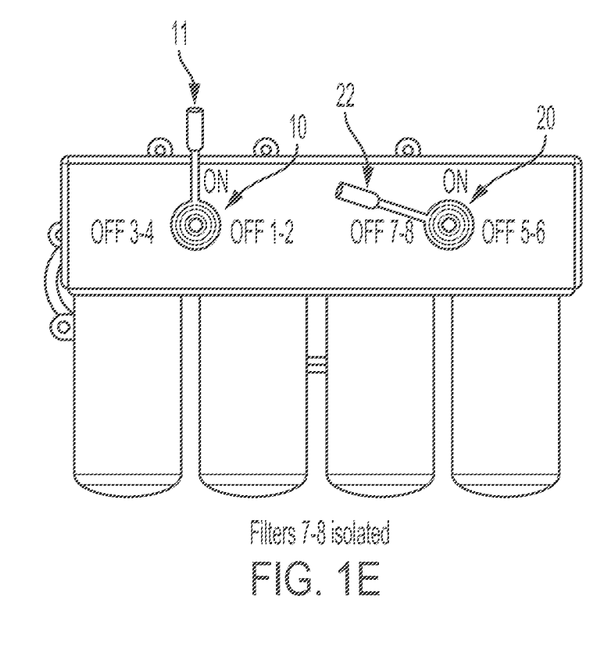
Figure 8A:
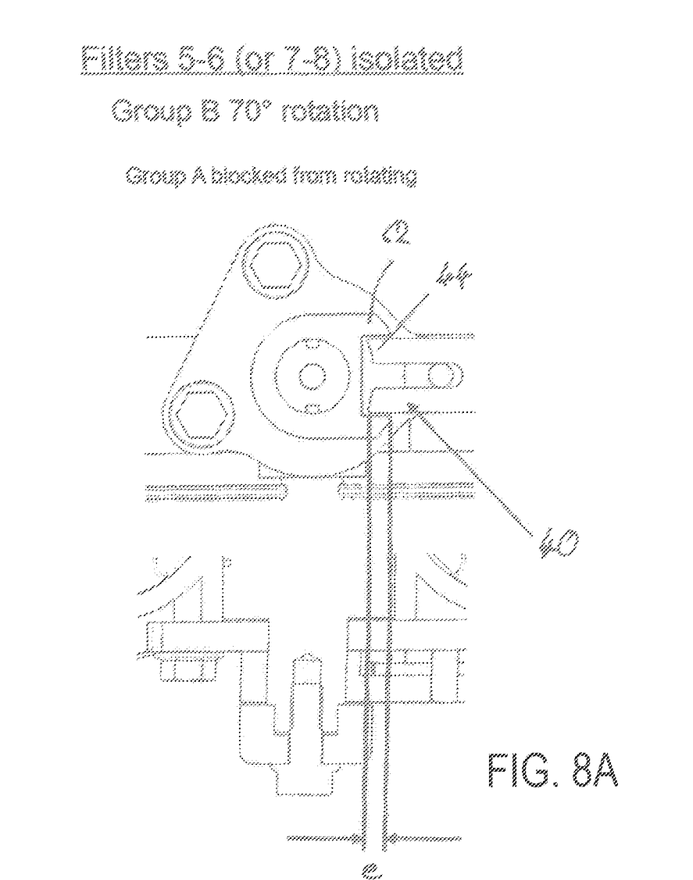
FIGS. 8A-8B: a frontal and a cut view of the mechanical blocking system together with enlarged portions for a situation where the second operating element is in an isolating position
Figure 8B:
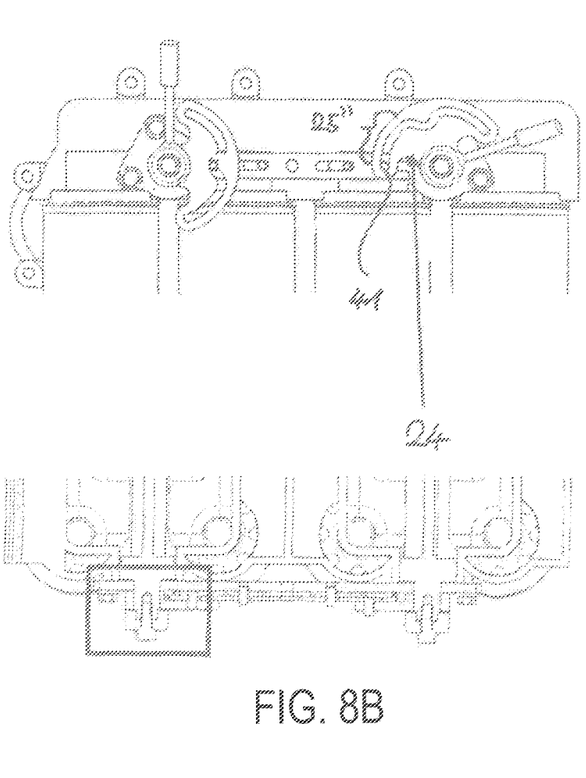

FIGS. 8A-8B shows the corresponding situation for group A or the first operating element 10 being blocked by the second operating 20 being in the first isolating position, corresponding to the situation of FIG. 1D.

Figure 9A:
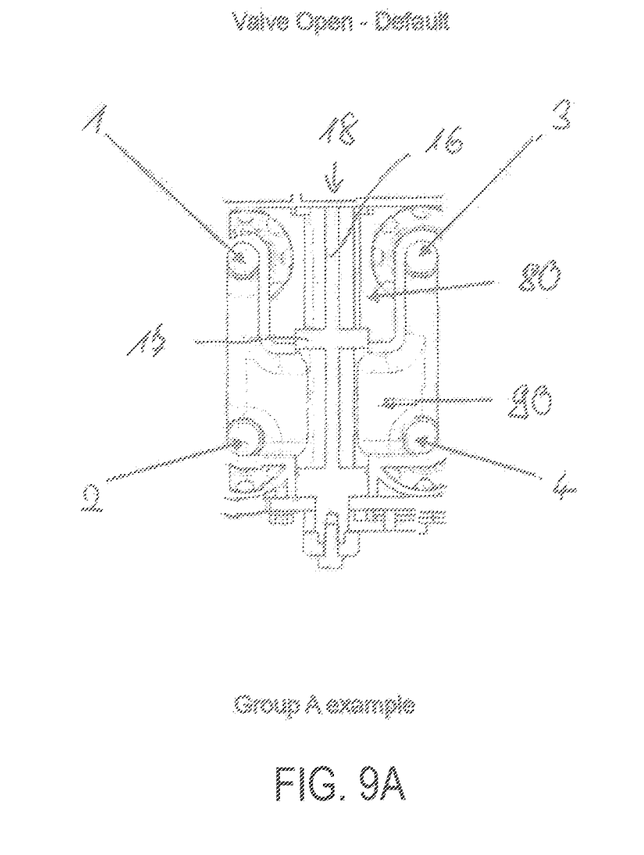
FIGS. 9A-9C: cut views through the valve element of the first operating element in the default position.
Figure 9B:
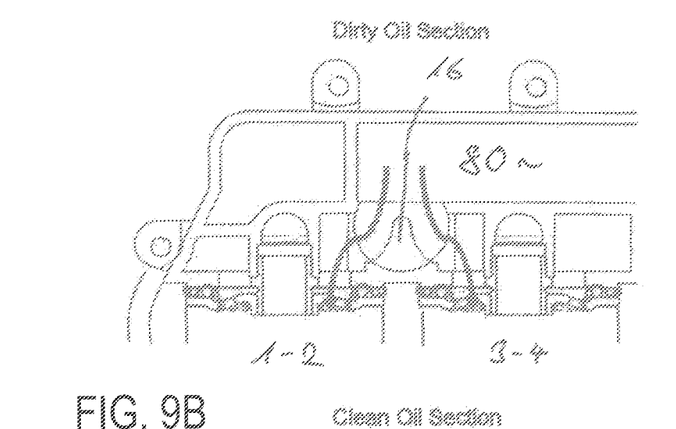
Figure 9C:
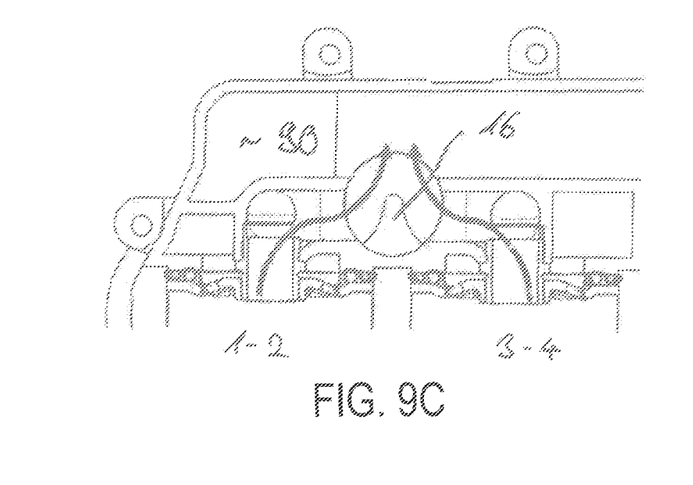

The configuration of the valve element 16 is shown in FIGS. 9A-9B for the first operating element 10 or group A. The configuration of the second operating element 20 and group B is the same.

The valve has two sections, one for the inlets to the filters, one or the outlets. The sections for the inlets correspond to the dirty oil section 80, the sections for the outlets to the clean oil sections 90 shown in FIGS. 9A-9B. The two sections are arranged next to each other along the axial direction of the valve element, and separated by a separating block 17. In each section, the valve element 16 will open a respective flow path from a fluid duct 80, 90 of the filtration system to the corresponding inlets or outlets of all the filters associated to the respective valve. By rotating the valve element in a first direction, the inlets and the outlets of the first filters will be blocked from the respective fluid paths of the filtration system, while the second filters will still be connected. A rotation in the second direction will block the inlets and outlets of the second filters while leaving the inlets and outlets of the first filters connected.

As can be seen from FIGS. 9A-9B, the filters 1-2 of the first duplex filter are connected in parallel both on the outlet and on the inlet side to the valve. The same is true for the filters 3-4 of the second duplex filter. Instead of using duplex filters, single filters could equally be used.

As shown in FIG. 2, each filter has a filter head housing 90 comprising the connections to the respective valve, and a filter cartridge housing 91 connected to the filter head housing 90. Thereby, if the filter is isolated from the filtration system, the filter cartridge housing 91 can be removed, the filter cartridge replaced and the filter cartridge housing installed again.

The filtration system of the present disclosure can for example be used for internal combustion engines, for instance, as a filtration system of the lubricating system.

The filtration system can also be used in any other application where a number of filters are operating in parallel in a fluid duct.

The invention claimed is:

1. A filtration system comprising:
    a plurality of filters, the plurality of filters comprising a first group of filters and a second group of filters, the first group of filters comprising at least two filters and the second group of filters comprising at least two further filters;
    a first operating element movable from a default position to a least one isolating position for isolating at least one filter of the first group of filters from the filtration system;
    a second operating element movable from a default position to at least one isolating position for isolating at least one filter of the second group of filters from the filtration system; and
    a mechanical blocking mechanism that is actuated by a movement of the first operating element out of its default position to block the second operating element in its default position and actuated by a movement of the second operating element out of its default position to block the first operating element in its default position,
    wherein, in the default position of the first operating element, all the filters of the first group of filters are connected to the filtration system,
    wherein, in the default position of the first operating element, all the filters of the first group of filters are connected to the filtration system, and, in the default position of the second operating element, all the filters of the second group of filters are connected to the filtration system, and
    wherein the first operating element and the second operating elements are each configured to selectively isolate at least one first filter out of the respective group of filters from the filtration system in a first isolating position and at least one second filter out of the respective group of filters in a second isolating position.

2. The filtration system according to claim 1, wherein each filter is at least a duplex filter comprising two filters or filter elements arranged in parallel.

3. The filtration system according to claim 1, wherein all the filters are arranged in parallel in a fluid duct of the filtration system.

4. The filtration system according to claim 1, wherein the mechanical blocking mechanism comprises a first blocking element operated by the first operating element to block the second operating element and a second blocking element operated by the second operating element to block the first operating element.

5. A filtration system comprising a plurality of filters, a first operating element movable from a default position to a least one isolating position for isolating at least one filter of a first group of filters from the filtration system and a second operating element movable from a default position to at least one isolating position for isolating at least one filter of a second group of filters from the filtration system, comprising:
    a mechanical blocking mechanism that is actuated by a movement of the first operating element out of its default position to block the second operating element in its default position and actuated by a movement of the second operating element out of its default position to block the first operating element in its default position,
    wherein the mechanical blocking mechanism comprises a first blocking element operated by the first operating element to block the second operating element and a second blocking element operated by the second operating element to block the first operating element, and
    wherein the blocking elements are slidably arranged on the filtration system to be moved from a default position to a blocking position.

6. The filtration system according to claim 5, wherein the first blocking element and the second blocking element are arranged on top of each other.

7. The filtration system according to claim 5, wherein the first blocking element is operatively connected to a drive element of the first operating element and the second blocking element in operatively connected to a driving element of the second operating element.

8. The filtration system according to claim 5, wherein the operating elements are rotatable from the default position to the isolating position or positions.

9. The filtration system according to claim 8, wherein a drive element for driving a blocking element is rotated by the rotation of the operating element.

10. The filtration system according to claim 8, wherein the operating elements comprise and/or operate a valve element that is rotated in a valve body for establishing at least one fluid communication through a fluid passage of the valve element in the default position and blocking the fluid communication in the isolating position.

11. The filtration system according to claim 8, wherein a first blocking element has a blocking section that is movable into blocking engagement with a blocking section of the first operating element and a second blocking element has a blocking section that is movable into blocking engagement with a blocking section of the second operating element.

12. The filtration system according to claim 11, wherein the blocking sections of the blocking elements are formed by respective end sections of the blocking elements and/or wherein the blocking sections of the operating elements are formed by respective recesses and/or wherein the blocking sections block rotational movement of the respective operating element when engaged with each other.

13. The filtration system according to claim 1, wherein each filter or filter element comprises at least one filtration head housing and a replaceable filter cartridge.

14. A machine comprising a fluid duct and a filtration system according to claim 1 arranged in the fluid duct.

15. The filtration system according to claim 6, wherein the first blocking element and the second blocking element are guided by one or more guide pins extending through linear slots in the blocking elements.

16. The filtration system according to claim 7, wherein the blocking elements are operatively connected to the respective drive element in one of the end sections of the respective blocking elements and/or wherein the drive elements each comprise a guide interacting with a pin of the respective blocking element.

17. The filtration system according to claim 8, wherein the operating elements are rotatable from the default position in two opposite directions into the respective isolating positions.

18. The filtration system according to claim 9, wherein a guide of the drive element is located at a first radial distance with respect to a rotation axis of the drive element in a default section and extends from the default section to an arcuate section where it extends at a second radial distance to the rotation axis of the drive element, wherein a pin of the blocking element is arranged in the default section of the guide when the operating element is in the default position and moves from the default section to the arcuate section once the operating element is rotated away from the default position to an isolating position, such that the blocking element is displaced by the difference in the radius of the guide in the default section to the arcuate section, wherein the guide has arcuate sections on both sides of the default section corresponding to the two isolating positions.

19. The filtration system according to claim 10, wherein the valve element establishes a first and a second fluid communication to an entry port and an exit port of each filter associated to the operating element in the default position and blocks the first and the second fluid communication to at least one filter in an isolating position.

20. The machine comprising a fluid duct and a filtration system according to claim 14 arranged in the fluid duct, wherein the machine is an engine and/or the fluid duct is an oil or fuel duct.

* * * * *